Aug. 5, 1958     O. VIERLING     2,845,844
VIEWING DEVICE FOR STEREO PICTURES
Filed May 15, 1956
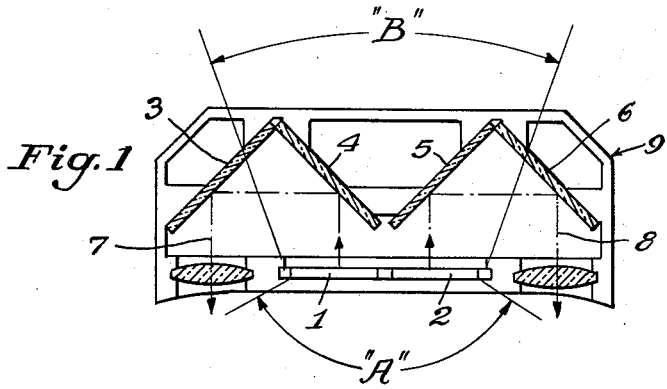
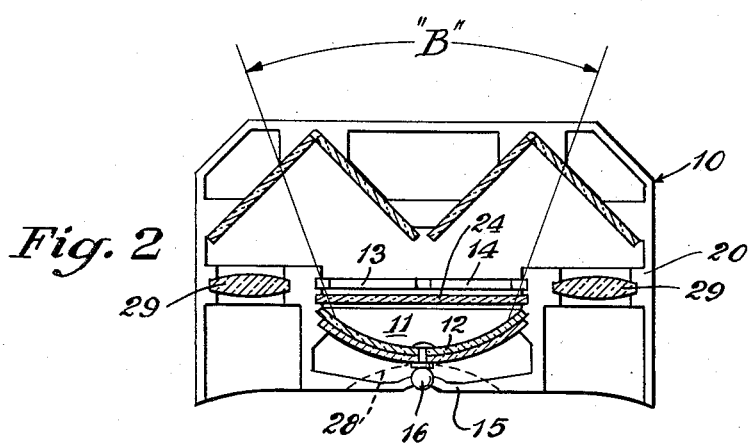
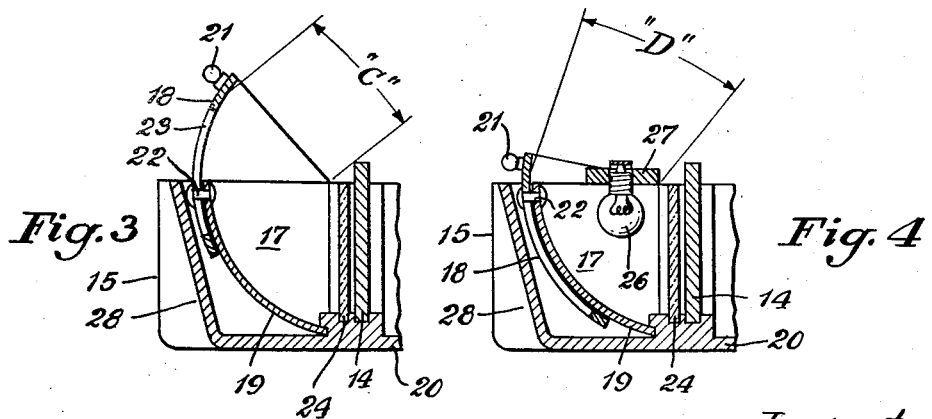
Inventor
Otto Vierling
by Singer Stern & Carlberg
Attorneys

United States Patent Office 2,845,844
Patented Aug. 5, 1958

2,845,844

VIEWING DEVICE FOR STEREO PICTURES

Otto Vierling, Stuttgart, Germany, assignor to Zeiss Ikon A. G., Stuttgart, Germany Application May 15, 1956, Serial No. 585,003

Claims priority, application Germany May 18, 1955

3 Claims. (Cl. 88—29)

This invention relates to viewing devices particularly for viewing stereo transparencies, in which the pictures of the pair of stereo-transparencies are viewed invertedly by the observer by a 180° light flux deflection.

A general object of the invention is to provide an improved, compact stereoscopic viewing device particularly adapted for stereo-transparencies.

Another object of the invention is to provide improved illuminating means for illuminating the stereo-transparencies used in a stereoscopic viewing device.

Still another object of the invention is to provide interchangeable illuminating means for a stereoscopic viewer, in which stereo-transparencies are utilized.

Yet a further object of the present invention is to provide improved light-reflecting means for a stereoscopic viewer for improved illumination of the stereo-transparencies used therein.

An ancillary object of the invention is to provide a removable, artificial light-source attachment for increasing the amount of incident light falling upon the stereo-transparencies used in a stereoscopic viewer.

Still a further object of the invention is to provide an improved, movable two-part reflector for a stereoscopic viewer, whereby the amount of incident light falling upon the reflector may be substantially increased.

Stereoscopic viewing devices, in which the stereo pictures are viewed invertedly by the observer by means of a 180° light ray deflection, are known in the art. Such devices are very advantageous, since the light-ray path between the stereo-pictures and the ocular eye piece is inverted by 180°, and consequently the construction of the viewer may thus be made very compact, and relatively short. The pair of stereo-pictures, to be viewed, are disposed between the viewing apertures in close proximity to the wall of the viewing device housing adjacent the observer. As a result, only the space angle, which is not obstructed by the observer, is left for the incident illumination of the pair of stereo-pictures. Thus, incident light can fall on the pair of pictures only from a direction opposite to the viewing direction. As a result, the described viewing devices are, therefore, limited only to stereopictures, which are used as directly viewed pictures. Such devices cannot be used for stereo-transparencies. However, modern miniature stereo-photography, particularly the stereo-colored-photography uses exclusively transparencies.

In order to utilize the advantages of the aforementioned known devices in connection with stereo-transparent arrangements, it is suggested, in accordance with the present invention, to provide between the transparencies and the wall of the housing of the viewing device adjacent the viewer a lighting means, which may be used for the illumination of the transparencies.

Without using additional illumination means, it is apparent that the space angle, from which the incident light will fall upon the transparencies in the desired direction, is obstructed when the device is in the viewing position. It is, therefore, only possible to utilize the remaining space angle in the viewing direction. For this purpose it is necessary to invert the light rays, and this can be obtained by means of a reflector, which is positioned in front of the transparencies in the direction of viewing. Its location and its form are selected in such a manner that the incident light from outside of the viewing device, in the unobstructed region, is turned by the reflector, and is directed upon the transparencies. This reflector may be collapsed, and, when necessary, can be designed to be swung externally of the housing of the viewing device.

Another possibility of illuminating the transparencies in the desired manner comprises the use of an illuminating device in the form of a transparent body designed in the form of a light-guiding means. The particular form of the light-guiding means may be such, that the light from externally of the housing may be directed upon the transparencies.

However, the incident light coming from the outside is not always satisfactory because of insufficient brightness, or because of differences in color brightness. In addition, viewing devices for stereo-transparencies are many times used in rooms, in which, in many cases, there is insufficient light of proper intensity. It is, therefore, necessary to use, in addition, an artificial light source as an aid to one of the suggested illuminating devices. The artificial light source may be disposed externally of the confines of the viewing device, which are dictated by the necessities of the optical devices in the viewing device. It is also possible to use the above-described illuminating means for transmitting the light from the artificial light source for the illumination of the stereo-transparencies. But it is moreover possible to locate the artificial light source in the region between the stereo-transparencies and the housing wall adjacent the viewer, whereby an additional reflector, as mentioned above, may be provided for this purpose.

In order to permit the use of the suggested viewing device, independently of the availability of an artificial light source, and hence independent of a necessary current source, it is a further feature of the present invention that the artificial illumination means, together with its current source, is designed to be removable, so that the described reflector, or the light-guiding means, can be used for illuminating the stereo-transparencies.

The distribution of the incident light upon the stereo-transparencies can be equalized, in known manner, by utilizing a diffusion screen, which is placed in front of the transparencies in the direction of the incident light. The illumination device, which may be used above a reflector, may consist of the light guiding means, or of an artificial light source. It may be advisable, for instance, to use one or the other of the suggested illuminating means in accordance with the color characteristics of the particular stereo-transparencies. For this reason, the above-mentioned illuminating devices are arranged to be interchangeable with each other.

The space, which is provided for the illuminating means, can advantageously be adjusted to accommodate the shape of the face of the observer by shaping a section of the wall of the housing adjacent the viewer. Thus, a cutout portion for the accommodation of the nose of the viewer may be provided.

Further objects and advantages will readily become apparent, upon reading the following specification, taken in conjunction with the drawing, in which:

Fig. 1 shows a schematic view of the viewing device as used with stereopictures;

Fig. 2 illustrates an embodiment of the invention in which a removable reflector is employed as an illuminating means to be used with stereo-transparencies;

Fig. 3 is a fragmentary, vertical sectional view through a modified type of two-part reflector device, which may be expanded upwardly out of the top of the viewer housing; and Fig. 4 illustrates, in fragmentary manner, how a detachable, artificial light source may be used additionally with the reflecting arrangements of the invention, the section being taken along the same line of the housing as in Fig. 3.

Referring to the drawing, and more particularly to Fig. 1 thereof the reference numerals 1 and 2 designate the stereopictures. The images of the pictures are transmitted to the observer by means of mirror 3, 4 and 5, 6. The pairs of mirrors 3, 4 and 5, 6 have intersecting edges, which are substantially parallel to the plane of the stereopictures 1, 2. It will be apparent that the images of the pictures are inverted by a lateral reflection of the light rays 7, 8 through 180°. It will be obvious that when the viewer 9 is in the operating position, no incident light can fall upon the pictures from the space angle A because of the obstruction by the observer. Only illumination from the space angle B is available. Hence, with the illuminating arrangement of the viewer 9 of Fig. 1, if there is no provision for additional inverting means only directly viewed pictures may be used.

In order to eliminate this limitation of the viewer 9 of Fig. 1, in accordance with the present invention, it is suggested to construct a stereoscopic viewer 10, as in Fig. 2. It will be noted that an illuminating means 11, in the form of a reflector 12, is provided between a pair of stereo-transparencies 13, 14 and the wall 15 of the viewer housing adjacent the observer. The location and form of the reflector 12 are selected in such a manner that the pair of transparencies 13, 14 are illuminated from the space angle B in a satisfactory manner. The reflector 12 has its vertical edges slidably guided in guideways formed in the casing 10 as is clearly shown in Figure 2. To facilitate ready removal of the reflector 12 from the viewer 10, a handle 16 may be provided to enable the reflector 12 to be removed from said guideways in the casing 10.

Instead of employing a single reflector 12, as illustrated in Fig. 2, the illuminating means 11 may comprise a multipart reflector 17, as shown in Figs. 3 and 4. Here, the reflector 17 may consist of two expandable parts 18 and 19, which are slidable relative to each other to expanded and collapsed positions. The reflector section 19 is held in the casing 10 in a manner similar to that disclosed in connection with Figure 2. As a result, the useful space angle B of Fig. 2 may be increased by expansion of the two-part reflector 17 to include the space angle C, or the space angle D, as indicated in Figs. 3 and 4. It will be apparent that the reflector part 18 is rotated out of the viewer housing 20 preferably by means of a handle 21, to adjustably include larger space angles.

As shown in Figs. 3 and 4, the reflector 17 includes the two halves 18 and 19, whereby the half 18 may project to a greater or lesser extent out of the viewing housing 20 according to the light conditions. A pin 22 on the reflector section 19 is used for guiding the movable half of the reflector 18, passing through a slot 23 therein. A diffusion screen 24 is utilized in front of the stereo-transparencies 13, 14 in order to compensate for differences in brightness, and to equalize the illumination in a manner well known in the art.

Instead of utizing the illuminating means previously described, an artificial light source may be employed 26, or the latter may be used additionally with one or another of the aforesaid illuminating devices, so as to make the viewing of the stereo-transparencies independent of the outside light conditions. A particularly advantageous construction of the viewing device 10, in which it is of very compact size, is illustrated in Fig. 4, wherein the artificial light source 26 is located between the transparencies 13, 14 and the wall 15 of the housing 20 adjacent the viewer. As shown, the reflector halves, 18, 19 assist in providing additional illumination. The light source 26 may be secured to a bracket arm 27, the latter in turn being supported, for instance, on a side wall of the housing 20. Preferably a dry battery, not shown, may be used as a source of supply of current for the light source 26, and the light source 26 and battery (not shown) to be mounted on the bracket arm 27 so that they may be provided as a unitary structure to facilitate removal and interchangeability. It is then possible to use one or another of the suggested illuminating means.

The side 15 of the viewer housing 20, which is adjacent the observer, may be provided with a cut-out portion 28 to accommodate the nose of the observer, so as to reduce as much as possible the distance between the eyes of the observer and the ocular lenses 29 shown in Fig. 2.

It will be apparent from the foregoing description that I have provided a very compact stereoscopic viewer adaptable for use with stereo-transparencies, in which illuminating means of different forms may be employed separately, or collectively, according to the light conditions.

Although I have shown and described specific arrangements, it is to be clearly understood that the same were merely for the purpose of illustration, and that changes and modifications may readily be made in the stereoscopic viewer by those skilled in the art without departing from the spirit and scope of the invention.

I claim as my invention:

1. A stereoscopic viewing device for invertedly viewing stero picture pairs with side reversed half pictures which effects an inversion of each picture by a double deflection of the path of rays of each 90°, comprising a casing having bottom, side and end walls, a pair of reflectors mounted between the corners of said casing and extending at an angle of 45° to said side and end walls, another pair of reflectors arranged in planes at right angles to the first mentioned reflectors providing two separate light pathways for reflecting light 180°, a pair of viewing apertures in said casing arranged with their optical axis extending toward the end wall of said casing and intersecting said first reflectors, a pair of transparent inverted pictures adapted to be slidably mounted in said casing between said viewing apertures, said reflectors being arranged to provide roof edges arranged in a plane offset from an parallel to the plane of said picture pairs, a cavity formed in said casing between said viewing apertures and a light reflecting mirror having a spherical reflector surface slidably arranged in said cavity to permit the reflecting mirror to be displaced vertically above said casing.

2. In a viewing device for stero picture pairs with side reversed half pictures which effects an inversion of each picture by a double deflection of the path of the rays of each 90° comprising a viewing casing having bottom, side and end walls, a reflecting mirror arranged between the corners of said casing and extending at an angle of 45° to one of the end walls and the adjoining side walls, a second pair of mirrors reversely arranged and supported on said end wall with the surfaces of said second pair of mirrors extending at an angle of 90° to said first mentioned mirrors, a pair of viewing apertures in said casing arranged in opposed spaced relation with respect to said mirrors, said casing being provided with a slideway for receiving transparent picture pairs in inverted relation, said picture pairs being arranged in a vertical plane offset from the apexes of said intersecting mirrors and with a plane extending vertically through the intersecting corners of said mirrors, said casing being provided with a cavity for receiving a spherically shaped mirror which has its vertical edges slidably received in guideways at each side of said cavity, a second spherical mirror slidably connected to said first named spherical mirror and a pin and slot connection between said first and second named spherical mirrors to permit said second named spherical mirror to be projected upwardly above said casing and retracted into said cavity.

3. In a viewing device for stero picture pairs with side reversed half pictures which effects an inversion of each picture by a double deflection of the path of the rays of each 90° comprising a viewer casing having a bottom wall provided with side walls connected by an end wall, a pair of reflecting mirrors arranged in the corners of said casing between each side wall and said end wall, another pair of reflecting mirrors arranged at an angle of 90° with their edges intersecting the edges of the reflecting mirrors mounted in the corners of said casing, a pair of viewing apertures supported by said side walls, a slide for receiving picture pairs mounted between said viewing apertures in a plane parallel to and offset from a plane extending across the intersecting points of said reflecting mirrors, said casing being provided with a cavity between said viewing apertures, a spherical mirror mounted in said cavity and arranged to reflect external light through said picture pairs, a second spherical reflecting mirror slidably arranged with respect to said first named spherical mirror to permit the same to be projected above said viewer casing and retracted into said cavity, a pin and slot connection between said spherical reflecting mirrors to guide the second named spherical mirror into and out of said cavity and a handle attached to said second named spherical mirror to facilitate withdrawal of said second named spherical reflecting mirror from said cavity.

References Cited in the file of this patent

UNITED STATES PATENTS

| | | |
|---|---|---|
| 2,520,432 | Robertson | Aug. 29, 1950 |

FOREIGN PATENTS

| | | |
|---|---|---|
| 26,248 | Great Britain | of 1902 |